Patented Sept. 8, 1925.

1,553,162

UNITED STATES PATENT OFFICE.

STANLEY HILLER, OF OAKLAND, CALIFORNIA, ASSIGNOR TO STANLEY HILLER, INC., OF OAKLAND, CALIFORNIA, A CORPORATION OF CALIFORNIA.

PROCESS FOR MANUFACTURING OLIVE OIL.

No Drawing. Application filed July 6, 1925. Serial No. 41,860.

*To all whom it may concern:*

Be it known that I, STANLEY HILLER, a citizen of the United States, residing at Oakland, in the county of Alameda and State of California, have adopted and invented certain new and useful Improvements in Processes for Manufacturing Olive Oil, of which the following is a specification.

The present invention relates to improved processes for extracting oil from olives and is a continuation in part of the subject matter contained in my copending application S. N. 724,663, filed July 7, 1924, and copending application S. N. 603,343, filed Nov. 25, 1922.

The natural constituents of ripe olives in condition for extracting the oil comprises approximately 40 per cent to 45 per cent moisture, from 17 to 29 per cent oil, and about 16 per cent pits, and the remainder solids other than pits. Because of this relatively high percentage of moisture and oils, I have discovered that it is possible to extract substantially all of the oil from the olives so that a high grade oil is produced, by reducing the oil bearing meat to a mass of finely divided particles which will remain suspended in the natural liquids of the olive and there will be no tendency for the solids to separate from the liquid by settling. The division of solids is so fine that the liquids are freed from the solid structure and what may be termed a colloidal suspension of the solid constituents of the oil bearing flesh of the olives in the natural liquid constituents is formed. The natural proportions of oil and water in the olives as above set forth is such that, in producing the necessary fineness or disintegration of the solids of the olive to form the colloidal suspension, complete emulsification of the natural oil content in the natural water content occurs, so that the oil and water constituents will not separate by settling but separation may be effected by proper centrifuging. This emulsion must be broken down to effect a separation of the oil and water. It is believed that certain natural constituents of the olive act as agents causing this emulsification.

In carrying out my invention the oil bearing flesh or meat of the olives is separated from the skins and pits in any suitable manner. The flesh or meat is then treated to reduce the solids contained therein to such a finely divided state that a suspension of the solid meat content in the natural liquid content of the olives is produced, from which the oil and solids, will not separate by settling, even when the mixture is thinned by the addition of water. The natural proportions of solid and liquid content in the olive meats is such that when the required fineness of division of solids has been attained, the mass will be of such consistency that it will flow slowly. This mass consists of a suspension of the finely divided solids in an emulsified mixture of the natural oils and liquids which is then treated to separate the suspended solid particles from the emulsified liquid mass, preferably by centrifuging. After the solid particles have been separated, the emulsified liquid mixture remains, from which the oil may be separated by centrifuging.

Owing to the fact that a suspension of finely divided solids in an emulsified liquid is formed, two centrifuging operations are at present practically necessary, the first at relatively low speeds to separate the solids, and the second at relatively higher speeds to separate the oil. It is possible, however, to separate the solids and oils and the remainder of the mass in one centrifuging operation and this method of separation is contemplated as being within the scope of the invention.

In practice I have discovered that it is possible to utilize well known forms of high pressure screw presses commonly used for pressing of oils from seeds and nuts to effect separation of the meat or flesh, pits, and skins, and the formation of the colloidal suspension. The olives when fed whole into such screw presses, as for example are shown in U. S. Patents Nos. 836,701; 829,315 and 1,049,834; and in copending application S. N. 724,662, filed July 7, 1924, are ground and crushed by the screw action, the meat is reduced to a pulp, and the pulp is forced by the high pressures developed, out through the fine openings of the screen in the press body in the form of a colloidal suspension of solid particles in an emulsion of the natural liquid content of the olives. The skins and the unbroken pits, and a small part of the flesh adhering thereto are pressed into a cake and pass out of the discharge end of the press. My invention is founded primarily on my discovery of this unexpected action of olives when passed through screw presses of the type above mentioned, and as sold for many years for the purpose of expressing oil bearing materials, such as cottonseed, peanuts, copra, and the like, and is the result of experimental efforts to express the oil from olives under the assumption that the action would be the same as is obtained in the expressing of olives in the well known plunger presses. The pressures developed in screw presses of the character mentioned range from 200 pounds upward to what has been estimated to be as high as 20,000 pounds per square inch, but it is believed that the most effective pressures for the present invention lie in the range of 500 to 5,000 pounds per square inch, with screen openings in the press body lying under 0.03 of an inch and preferably in the range of 0.005 to 0.02 of an inch. It will be understood however, that the invention is not to be limited by the figures here given for screen sizes and pressures.

Although the preferred method of carrying out my invention on olives is to utilize a high pressure screw press, such as is commonly used for expressing oils from seeds, it is obvious that my process may be carried out by first crushing and grinding the olives to break the skins, and pulp the meat, leaving the pits substantially uncrushed, separating the skins and pits from the mass in any suitable manner, then forcing the residue of pulp under high pressure through screen openings sufficiently small to reduce the mass to a colloidal suspension in the emulsified natural liquid content of the meat, or any other means for disintegrating the pulp and forming the suspension of solids in the natural liquid content may be utilized.

As above mentioned, the natural proportions of solids, oils and other liquids in olives is such that the suspension of the solid flesh content in the natural liquid content will be of such consistency that the mass will flow slowly. Sufficient water is added to make the mass flow freely into a centrifugal separator set at a speed to separate the solid content therefrom. The addition of twenty-five parts of water to fifty parts of the suspension will ordinarily be sufficient to make the emulsified mass flow freely, but the addition of excess water does no harm. The water is added simply to make the mass sufficiently fluid to be effectively handled in a centrifugal separator. After the solids are separated, the remaining liquid emulsion is again centrifuged at a suitable speed to separate the oil from the remainder of the mass.

Having described a preferred embodiment of my invention, what is desired to be secured by Letters Patent and claimed as new is:

1. The process of extracting oils from olives which comprises the steps of reducing the constituents of the meat of the olive to a colloidal suspension of finely divided solid constituents in an emulsion of the oil and water contained therein; and separating the suspended solid content from the emulsion, and the oil from the water.

2. The step in the process of extracting oil from olives which comprises reducing the oil bearing meat of the olives to a colloidal suspension of the solid content thereof in the natural liquid content thereof.

3. The steps in the process of extracting oil from olives which comprises reducing the same to a mass of skin, pits, and crushed meat; separating the skins and pits from the crushed meat; and reducing the crushed meat to a colloidal suspension of the solid content thereof in the natural liquid content thereof.

4. The process as set forth in claim 3 together with the steps of separating the solid content from the natural liquid content, and separating the oil from the liquid content.

5. The steps in the process of extracting oils from olives which comprises separating the skins and pits from the oil bearing meat; and reducing the oil bearing meat to a colloidal suspension of the solid matter contained therein in an emulsified mixture of the liquid contained therein.

In testimony whereof, I affix my signature.

STANLEY HILLER.